(12) United States Patent
Siegel et al.

(10) Patent No.: US 7,571,148 B2
(45) Date of Patent: Aug. 4, 2009

(54) SYSTEM AND METHOD FOR GRAPHICALLY REPRESENTING UNCERTAINTY IN AN ASSISTED DECISION-MAKING SYSTEM

(75) Inventors: Neil Siegel, Rolling Hills Estates, CA (US); Robert Lindeman, Centennial, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 217 days.

(21) Appl. No.: 11/143,036

(22) Filed: Jun. 2, 2005

(65) Prior Publication Data

US 2006/0294035 A1     Dec. 28, 2006

(51) Int. Cl.
    *G06F 9/44*         (2006.01)
    *G06N 7/06*         (2006.01)
    *G06N 7/02*         (2006.01)
(52) U.S. Cl. ....................................... 706/52
(58) Field of Classification Search ................ 706/52
See application file for complete search history.

(56) References Cited

U.S. PATENT DOCUMENTS

| | | | | |
|---|---|---|---|---|
| 5,448,233 | A | * | 9/1995 | Saban et al. ............. 340/963 |
| 5,704,017 | A | * | 12/1997 | Heckerman et al. .......... 706/12 |
| 5,774,121 | A | * | 6/1998 | Stiegler .................. 715/769 |
| 5,880,742 | A | * | 3/1999 | Rao et al. ................ 345/440 |
| 5,930,762 | A | | 7/1999 | Masch |
| 6,026,399 | A | | 2/2000 | Kohavi et al. |
| 6,336,296 | B1 | | 1/2002 | Ishibashi et al. |
| 6,460,049 | B1 | | 10/2002 | Becker et al. |
| 6,735,596 | B2 | | 5/2004 | Corynen |
| 7,043,075 | B2 | * | 5/2006 | Gutta ..................... 382/158 |
| 2002/0099672 | A1 | | 7/2002 | Ganesh |
| 2004/0002776 | A1 | | 1/2004 | Bickford |
| 2004/0267693 | A1 | * | 12/2004 | Lowe et al. ................ 707/1 |
| 2005/0049986 | A1 | * | 3/2005 | Bollacker et al. .......... 706/46 |

FOREIGN PATENT DOCUMENTS

WO    WO 2004/001631 A2    12/2003

OTHER PUBLICATIONS

"The vector datatype" The University of Edienburgh School of Informatics. Sep. 1999 as defined by wayback machine.*

(Continued)

*Primary Examiner*—David R Vincent
*Assistant Examiner*—Ben M Rifkin
(74) *Attorney, Agent, or Firm*—Tarolli, Sundheim, Covell & Tummino LLP

(57) ABSTRACT

Systems and methods are provided for graphically representing uncertainty in an assisted decision-making application. A database contains a class vector for each of a plurality of objects of interest. A given class vector includes a plurality of possible classes for its associated object of interest and a corresponding set of confidence values. The database also contains a set of assumptions associated with each confidence value. A user interface displays a plurality of graphics representing the objects of interest. A given graphic includes a set of at least two class icons, each corresponding to one of the plurality of classes associated with its corresponding object of interest. The graphic also includes a qualitative indication of the confidence values associated with the set of classes. The assumptions associated with a given confidence value are retrievable by a user by selecting the class icon associated with the confidence value.

22 Claims, 4 Drawing Sheets

OTHER PUBLICATIONS

Randy J. Lefevre, et al.: "*Weather Forecast uncertainty Management and Display*"; ApMet, Albuquerque, New Mexico; Charles River Analytics, Inc., Cambridge, Massachusetts, 5 pages.

Richard Finger, et al.: "*Graphical Display of Uncertainty—Utilizing Graphical Formats to Convey Uncertainty in a Decision Making Task*"; University of Buffalo, State University of New York; in Theoretical Issues in Ergonomics Science (2002). 3, 1, 1-25.pp. 1-62.

* cited by examiner

SYSTEM AND METHOD FOR GRAPHICALLY REPRESENTING UNCERTAINTY IN AN ASSISTED DECISION-MAKING SYSTEM

TECHNICAL FIELD

The present invention relates to decision-making tools and, more particularly, to systems and methods for graphically representing uncertainty in an assisted decision-making system, and for making more useful situation data available to human decision-makers and automated decision-support algorithms.

BACKGROUND

In the past, decisions frequently had to be made on minimal amounts of available data. Information traveled slowly, and the scope of the information available was within a scale that could be considered by a human mind. Frequently, the greatest problem facing a decision-maker was a paucity of information. Advances in information gathering and transmittal technologies have reversed this trend, making it easier to gather large amounts of information pertaining to a particular problem. A major task facing modern day decision-makers is filtering and organizing the received information into a useful form.

While automated classification and decision-making systems have become increasingly sophisticated, the human mind still outperforms automated systems on most real-world tasks. A limitation of human decision-making, however, is the inability of human beings simultaneously to consider a large number of factors. Decision-makers often find it difficult to combine mentally large amounts of evidence, since the human tendency is to postpone risky decisions when data are incomplete, jump to conclusions, or refuse to consider conflicting data. Accordingly, automated methods of organizing and displaying data can greatly aid human decision-makers.

In attempting to structure and filter the data presented to a human decision-maker, an unfortunate tendency of many automation systems intended to support decision-making is to oversimplify the situation presented to the decision-maker. While any real-world decision must include the consideration of many different types of uncertainty, this uncertainty is often hidden from the decision-maker within the automated system, leaving the user without explicit information regarding the uncertainty regarding each "fact" presented as relevant to the pending decision, which forces the decision-maker to guess about such uncertainty in arriving at a decision. Unfortunately, this can result in sub-optimal decisions, because vital information has in effect been hidden from the decision-maker by the automation system. A parallel situation pertains with regard to automated tools that perform analysis of a situation, and make either decisions or recommendations—current practice tends to "hide" the full range of interpretations of the input data, leading to inferior decisions and recommendations.

SUMMARY

In accordance with one aspect of the present invention, a system is provided for graphically representing uncertainty in an automated assisted decision-making application. A database contains a class vector for each of a plurality of objects of interest. A given class vector includes a plurality of possible classes for its associated object of interest, such that each entry in the class vector represents one of the possible outcomes/states/interpretations for the item represented by this class vector, and a corresponding set of confidence values (e.g., the probability that each outcome/state/interpretation is the correct one). The database also contains a set of assumptions associated with each confidence value. A user interface displays a plurality of graphics representing the objects of interest. A given graphic includes a set of at least two class icons, each corresponding to one of the plurality of classes associated with its corresponding object of interest. The graphic also includes a qualitative indication of the confidence values associated with the set of classes. In an exemplary implementation, the user interface can include decluttering tools that allow the user to set one or more criteria that control the number of classes displayed for a given object. The assumptions associated with a given confidence value can either be displayed in conjunction with the basic icons, or are retrievable by a user by selecting the class icon associated with the confidence value. Furthermore, the class vector can be made available for use by automated software tools that can themselves make either decisions or recommendations.

In accordance with another aspect of the present invention, a computer-readable medium is provided. A database stores a class vector for each of a plurality of objects of interest. A given class vector includes a plurality of possible classes for its associated object of interest, and a corresponding set of confidence values associated with the plurality of possible classes. The database also stores a set of assumptions associated with each confidence value. A graphical user interface is operative to display a plurality of graphics representing the objects of interest. A given graphic includes a set of at least two class icons, each corresponding to one of the plurality of classes associated with its corresponding object of interest, and a qualitative indication of the confidence values associated with the set of classes. The graphical user interface is operative to receive input from a user, and display the assumptions associated with a given confidence value, for example, in response to the input from the user.

In accordance with yet another aspect of the invention, a method is provided for avoiding error due to thresholding in an assisted decision-making application. A plurality of icons are displayed representing a plurality of classes associated with an object of interest. A qualitative indication is displayed representing respective confidence values associated with the plurality of classes. A set of assumptions associated with a given confidence value is provided in response to input from a user.

DETAILED DESCRIPTION

The present invention relates to systems and methods for representing uncertainty in an assisted decision-making application in a manner readily comprehensible to a human being. The present invention has broad applicability to decision-making in circumstances where evidence is uncertain, incomplete, and possibly conflicting. An assisted decision-making system in accordance with an aspect of the present invention can display icons representing a plurality of objects of interest to the user, wherein each object has at least one associated class. For each object, the associated classes can be ranked according to respective confidence values. A given object is external to the system represented by digital data derived from a source external to the system. It will be appreciated that the objects can include both tangible items (e.g., a vehicle) and conceptual items (e.g., a stock value).

The user can make decisions based upon the associated class of the objects. In a typical decision-making system, a user might see an object represented by a graphic containing an icon associated with its first-ranked class. In accordance with an aspect of the present invention, a plurality of icons can be displayed to the user to represent a plurality of possible classes, each having an qualitative representation of the confidence value associated with the plurality of classes. Accordingly, the user can explore all of the possible classes for a plurality of objects, as opposed to simply accepting the most likely class. This allows the user to look for patterns among the possible classes associated with each of a plurality of objects, improving the decision-making capability of the user.

It will be appreciated that the present invention can be used to assist a human decision-maker in a variety of decision-making applications in which multiple courses of action are considered. The systems and methods can be applied to applications ranging from high-level government policy to procurement decisions in a small business. Thus, while the exemplary embodiments illustrated within this application focus on military and defense applications, the present invention can be applied in other fields, such as industrial processes, design work, research, and corporate management.

Figure 1:
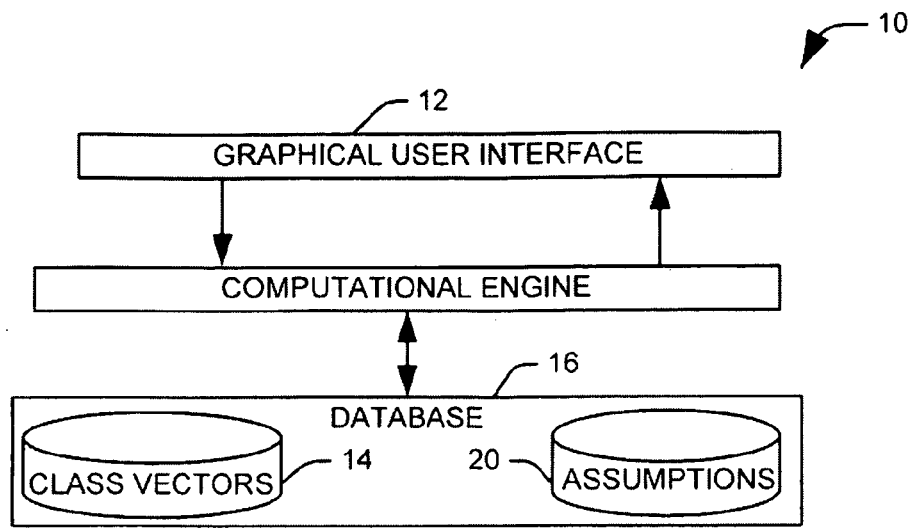
FIG. 1 illustrates a functional block diagram of an assisted decision-making system in accordance with an aspect of the present invention.

FIG. 1 illustrates an assisted decision-making system 10 that includes graphical illustration of uncertainty concerning the respective classes of a plurality of objects. The illustrated system 10 allows a user to explore patterns in the uncertainty associated with these classifications, such that a decision can be made based upon both a first ranked classification for each object (e.g., the class having a largest confidence value for the object) as well as second or lower ranked classifications. This allows the user to make decisions that account for situations in which the first ranked classification is incorrect. The classes associated with each object need not be mutually exclusive. For example, where the classes represent uses of a building, it will be appreciated that the same building can be used for multiple purposes. Thus, more than one class can be assigned to the building. Similarly, it will be appreciated that the confidence values associated with a given object are not normalized to an associated maximum value.

The assisted decision-making system 10 includes a graphical user interface (GUI) 12 that displays a graphic for each of a plurality of objections of interest comprising a plurality of icons representing the class membership of each of a plurality of objects of interest. Information about the class membership of each object of interest is represented as a class vector 14 in an associated database 16. A given class vector includes a plurality of classes associated with an object of interest and corresponding confidence values for the plurality of classes.

It will be appreciated that the nature of the confidence values will vary according to the method used to generate the confidence values. Accordingly, a given class vector represents at least a partial probability distribution of the class membership of the object.

The graphics can also include a qualitative representation of a confidence value associated with the class. For example, each class icon can have an associated bar graph that indicates its associated confidence value. Alternatively, a qualitative feature, such as the saturation, hue, size, or transparency of the class icon, can be utilized to represent the confidence value associated with the class. In accordance with an aspect of the present invention, a set of assumptions 20 underlying the confidence value of a given class can be made available to the user. For example, the set of assumptions 20 can be displayed in conjunction with the class icon, or the user can select a class icon to view the set of assumptions 20 underlying its associated confidence value. These assumptions can be stored in the database 14. The assumptions 20 can be represented in a number of ways, such as a structured text list or a belief network. It will be appreciated that the representation of the assumptions 20 can depend on the method used to determine the confidence value. By allowing the user to review the underlying assumptions behind each probability value, the user can use personal knowledge and current information to facilitate the interpretation of the probability values provided by the GUI 12.

In accordance with an aspect of the present invention, the GUI 12 can include "de-cluttering" tools that allow the decision-maker to reduce the amount of information provided by the system. For example, the user can instruct the system to display only the highest-probability outcome or the two highest-probability outcomes for each object or for selected objects. Similarly, the user can instruct the system to display all potential outcomes that meet a set of criteria, such as a threshold confidence level. Accordingly, the user can tailor the GUI 12 to the requirements of a specific application, such that only a desired amount of information is provided to the user at any given time.

Figure 2:
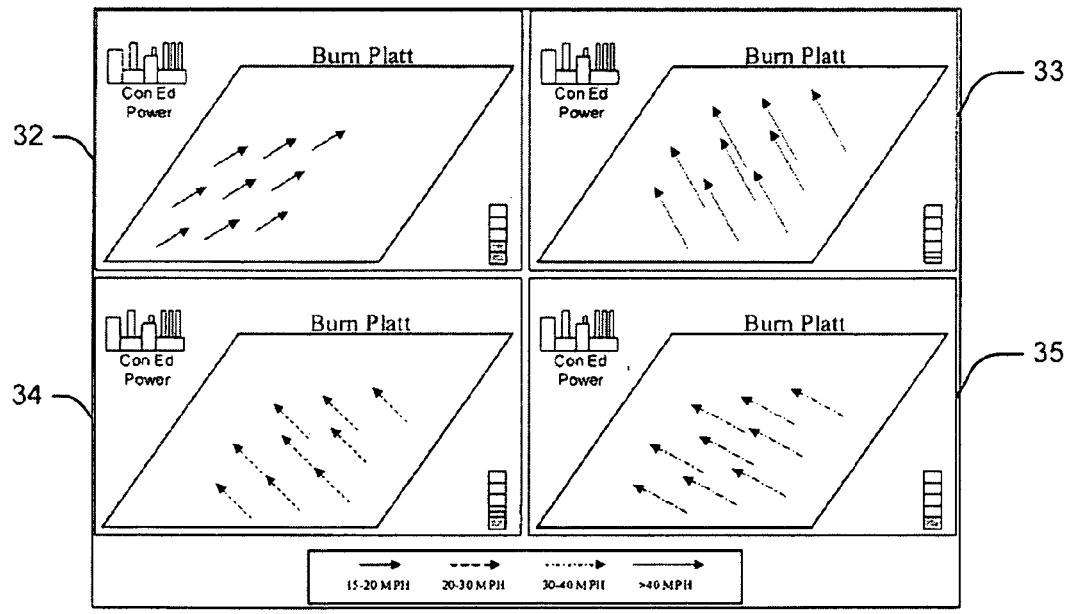
FIG. 2 illustrates an example of the hazards of thresholding in decision-making applications.

FIG. 2 graphically illustrates the dangers of thresholding, or eliminating classes with confidence values lower than that of a first ranked class, in a decision-making application. FIG. 2 illustrates four weather predictions 32, 33, 34, and 35 for a controlled burn and an associated probability that each prediction will occur. A typical decision-making system displays the most likely prediction 32 of the weather, ignoring any alternative predictions 33-35 and omitting the probabilities associated with each of the alternative predictions. In this case, the prediction 32 having the highest probability is that the wind will come from the southwest with speeds in the 15-20 MPH range. Under this prediction, the controlled burn can be conducted without danger to the structure. It will be appreciated that the probability of this occurring is only forty percent, yet in a thresholded system, it would be the only prediction presented to the user.

Looking at the three predictions with lower probability values, all indicate trends of much higher wind speeds and NW wind directions. In any of these scenarios, the structure would be endangered. While no single alterative prediction 33-35 has a probability value exceeding forty percent, taken together they represent a sixty percent chance that the structure would be endangered by a controlled burn. Accordingly, choosing to execute the burn based on the most probable prediction 32 would likely be risky given the probabilistic trend and prevalent wind direction of the other three predictions 33-35.

Figure 3:
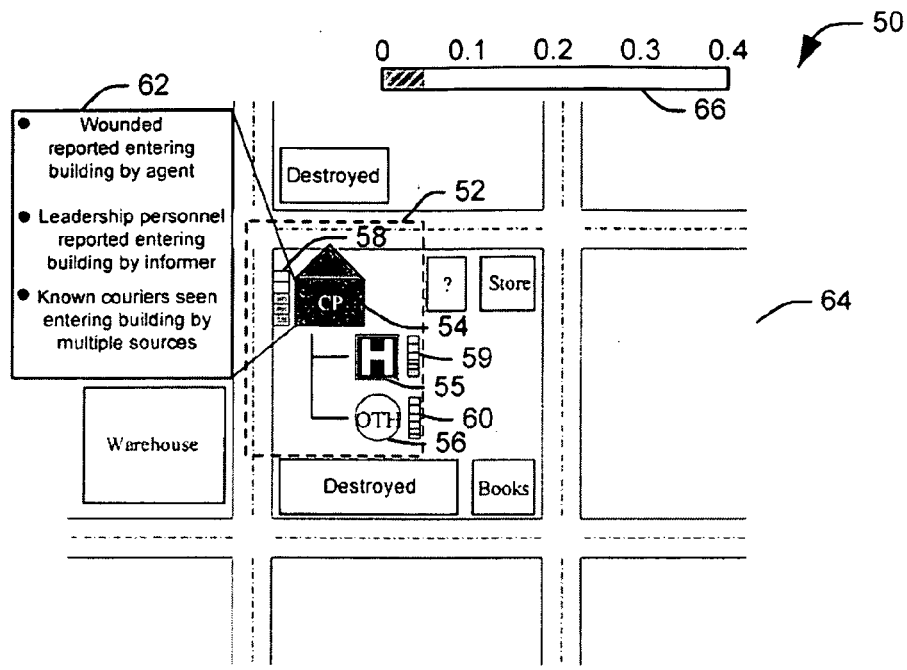
FIG. 3 illustrates a screen from an exemplary graphical user interface in accordance with an aspect of the present invention.

FIG. 3 illustrates a screen 50 from an exemplary graphical user interface (GUI). The illustrated GUI is part of a situational awareness system that illustrates the position of a plurality of objects within a theater of operations. For example, the objects can include vehicles, buildings, and other structures within the theater. In the illustrated example, an object of interest is represented by a graphic 52 showing each class associated with the object of interest and an associated probability value of the class. The graphic 52 can include a plurality of icons 54, 55, and 56, with each icon representing a possible class of the object of interest. Each icon includes a graphical representation 58, 59, and 60 of the confidence value associated with the class. In the illustrated example, the confidence value is represented as a vertical bar graph, but it will be appreciated that the confidence value can be represented in any form that can be quickly and accurately understood by a user. For example, the confidence for a given class can be expressed by changing the characteristics (e.g., saturation, hue, or transparency) of the class icon 54.

A given class icon can be expanded to show a plurality of assumptions 62. In the illustrated example, these assumptions take the form of a structured text list. The assumptions can include evidence, such as text documents or segments of text documents, used in determining the confidence value, as well as hypotheses suggested by and supported by the evidence. The assumptions can be collapsed to allow the user to resume a full view of the map. In the illustrated example, the list of assumptions 64 includes descriptions of items of evidence that might have been received in a military application. By explicitly displaying the evidence, the user can use personal knowledge to evaluate the reliability of the evidence. In addition, the map can indicate areas 64 for which information is unavailable or obsolete, as a graphical illustration of the fog of war. For example, these regions can be displayed with reduced brightness or indicated by a specific border. This allows users to account not only for the uncertainty in the displayed classifications, but for the uncertainty represented by areas of the map for which reliable information is not available such that such areas can be distinguished from areas about which affirmative statements can be made. For example, the map can distinguish unknown regions (e.g., "I haven't looked in this area, so I am reporting no enemy units within that area"), from known regions without enemy troops (e.g., "I have looked in this area, and affirmatively state that there are no enemy units within that area"). In current practice, both areas may look the same on a computerized map display.

In an exemplary implementation, the GUI can include decluttering tools 66 for allowing the user to control the amount of information available on the screen. For example, the user can collapse one or more class icons (e.g., 55 and 56) associated with a given object and their associated confidence value graphics (e.g., 59 and 60) such that only one or more top ranked class icons (e.g., 54) are shown. This can also be done on a global level, through a menu system, for example, such that only a selected number of class icons are displayed for each object of interest within the GUI. Alternatively, the user can set one or more criteria for the class icons to be displayed. For example, the decluttering tools can include a slider 66 that allows the user to set a threshold confidence value, such that class icons having an associated confidence value below the threshold are not displayed.

Figure 4:
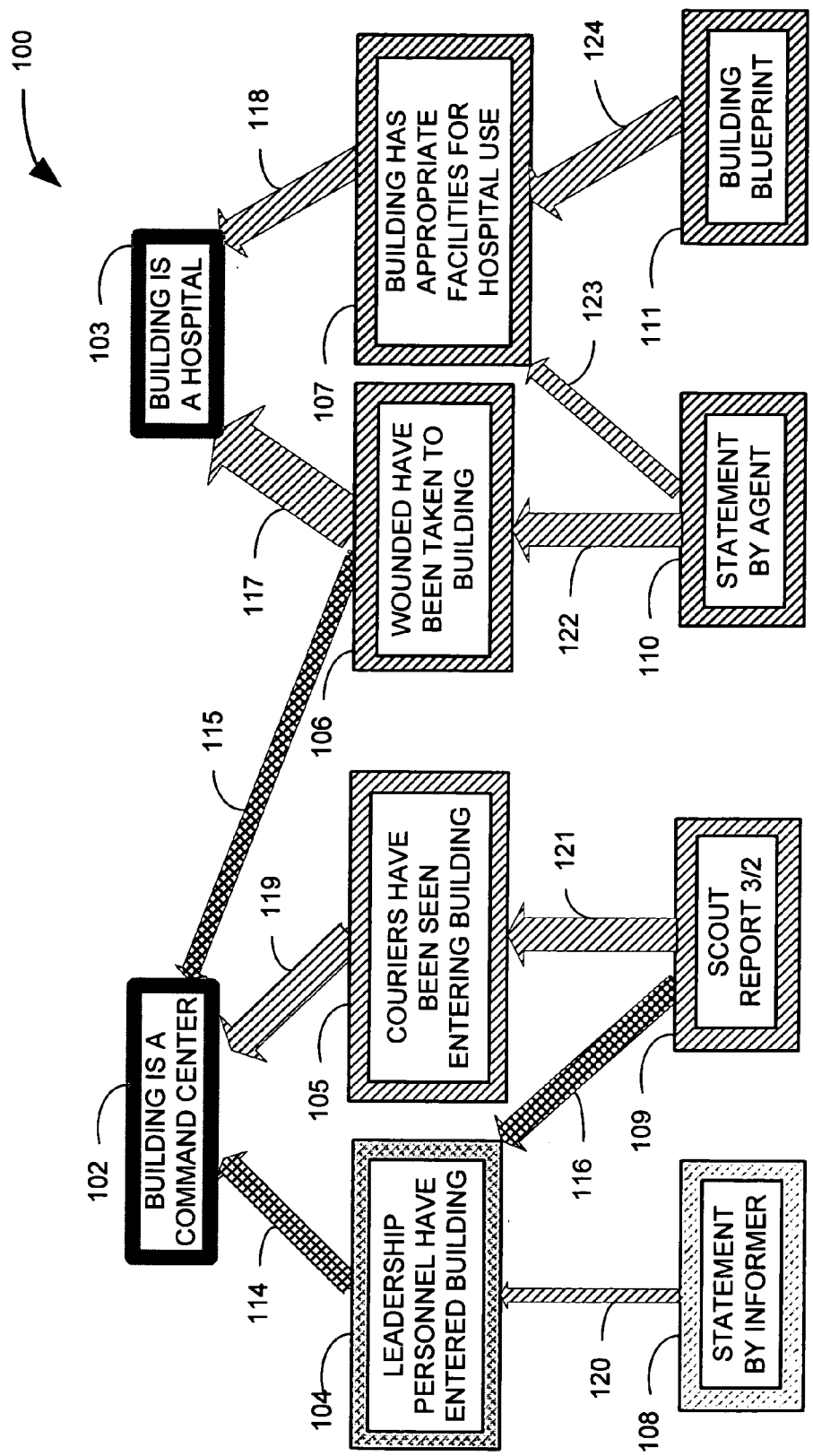
FIG. 4 illustrates an exemplary structured argument that can be used to convey the assumptions associated with a given confidence value to a user in accordance with an aspect of the present invention.

In accordance with an aspect of the present invention, the assumptions behind a given confidence value can be efficiently displayed as a structured argument. In an exemplary embodiment, the assumptions can be stored and displayed as an executable belief network that is operative to alter belief values within the network and the confidence value of a main hypothesis according to input from the user. FIG. 4 illustrates an exemplary structured argument that can be used to convey the evidence and reasoning behind a given confidence value to a user in accordance with an aspect of the present invention. The display illustrates a plurality of nodes 102,103, 104,105, 106,107,108, 109, 110, and 111 including one or more top level or main nodes 102 and 103 and a plurality of contributing nodes 104-111. Each of the nodes is associated with one of a plurality of hypotheses in the structured argument, with the top level nodes being associated with one or more main hypotheses. The nodes are interconnected by one or more connectors 114, 115, 116, 117, 118, 119, 120, 121, 122, 123, and 124. Each connector has an associated influence value that quantifies the logical relationship between the connected nodes.

The structured argument 100 can include quantitative indications of the importance of each node and connector. For example, the various nodes can have numerical belief values, quantifying the composite support for the hypothesis associated with the node. Similarly, a numerical connector strength can be specified for each node, indicating the importance of a lower level node to a given higher level node. The contributing nodes 104-111 can be divided into three basic groups according to the influence values of their connections to their respective child nodes. The first group comprises supporting nodes (e.g., 105-111), which, overall, increase the belief values of the nodes to which they contribute as their belief value increases. For example, node 106 supports the hypothesis that the building is a hospital (e.g., node 102) and detracts from the hypothesis that the building is a command center (e.g., node 103). Node 107 has more influence over node 103, via connector 117 than it does over node 102 through connector 115. Accordingly, node 106 is considered a supporting node, even though it detracts from node 102. Similarly, node 121 is a supporting node because it provides more support to node 105 than it detracts from node 104. In the illustrated implementation, supporting nodes are a first color, such as blue.

The second group of contributing nodes comprises detracting nodes (e.g., 104), which, overall, detract from the belief values of the nodes to which they contribute as their belief value increases. In the illustrated implementation, detracting nodes are a second color, such as red. In the illustrated implementation, the confidence value associated with each node is shown by the saturation of the node, such that nodes having a high confidence value have a high saturation and nodes having a low confidence value have a low saturation values, appearing faded. The connectors (e.g., 114-124) can be displayed as to give similar qualitative information concerning the influence value of the connector. For example, the thickness of a particular connector can vary with the magnitude of the influence value associated with the connector. Thus, connectors representing a strong logical relationship between hypotheses can be represented as thick lines, and connectors reflecting a more tenuous relationship can be represented as thinner lines. The sign of the influence value can be shown by color, with connectors having positive influence values being shown in a first color, and connectors having negative influence values being shown in a second color.

In the illustrated example, there are three levels of nodes in the diagram. The lowest level of nodes 108-111 represents raw evidence in the structured argument, such as text excepts and statements. This evidence provides various degree of support for a layer of intermediate nodes 104-107 in the next layer that represent intermediate hypotheses. It will be appreciated that a real world system can have many layers of intermediate hypotheses and that each layer, including the low level evidence, can comprise significantly more hypotheses. The intermediate hypotheses are statements that support or detract from main hypotheses in the system, represented by an uppermost layer of main nodes 102 and 103. The main hypotheses are the questions of interest in the system. By examining the structured argument, a user can quickly view the evidence supporting a given main hypothesis and the chain of reasoning linking the evidence to the hypothesis. Using this information, the user can better understand the sources of uncertainty in the decision-making process.

Figure 5:
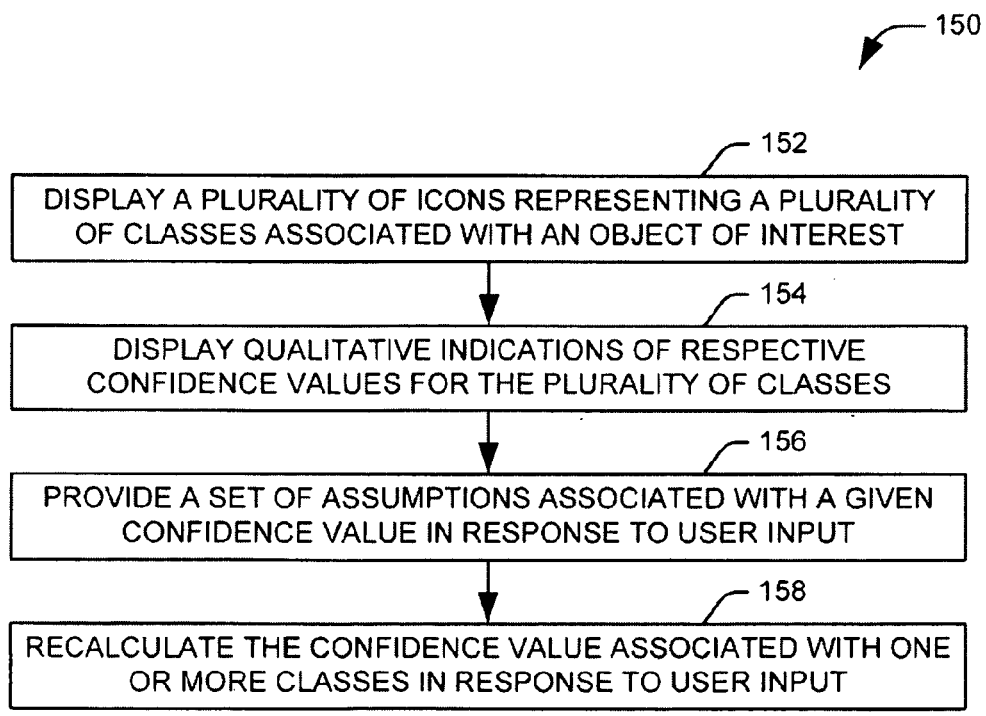
FIG. 5 illustrates a methodology for displaying uncertain information in an assisted decision-making application in accordance with an aspect of the present invention.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a methodology 150 for displaying uncertain information in an assisted decision-making application. At 152, a plurality of class icons are displayed to represent a plurality of classes associated with an object of interest. In an exemplary implementation, the classes are displayed in an order derived from their respective confidence values. At 154, a qualitative indication of respective confidence values associated with the plurality of classes is displayed. The qualitative indication can be incorporated in the class icon or it can be displayed in conjunction with the class icon. For example, the qualitative indication can include a bar graph displayed in conjunction with the class icon. Alternatively, the qualitative indication can include a feature of the class icon, such as its saturation, hue, or transparency.

At 156, a set of assumptions associated with a given confidence value is provided to the user in response to input from a user. The assumptions can be displayed in any form that can be quickly understood by the user, such as a plain text list of associated evidence and hypotheses supported by the evidence. In one implementation, the assumptions are displayed to the user as an executable belief network that is responsive to input from the user. Accordingly, the belief network can mathematically reconcile its associated belief values in response to changes in its belief values and influence values by the user. In such an implementation, the confidence value associated with the belief network can be recalculated at 158 to reflect the user's changes.

Figure 6:
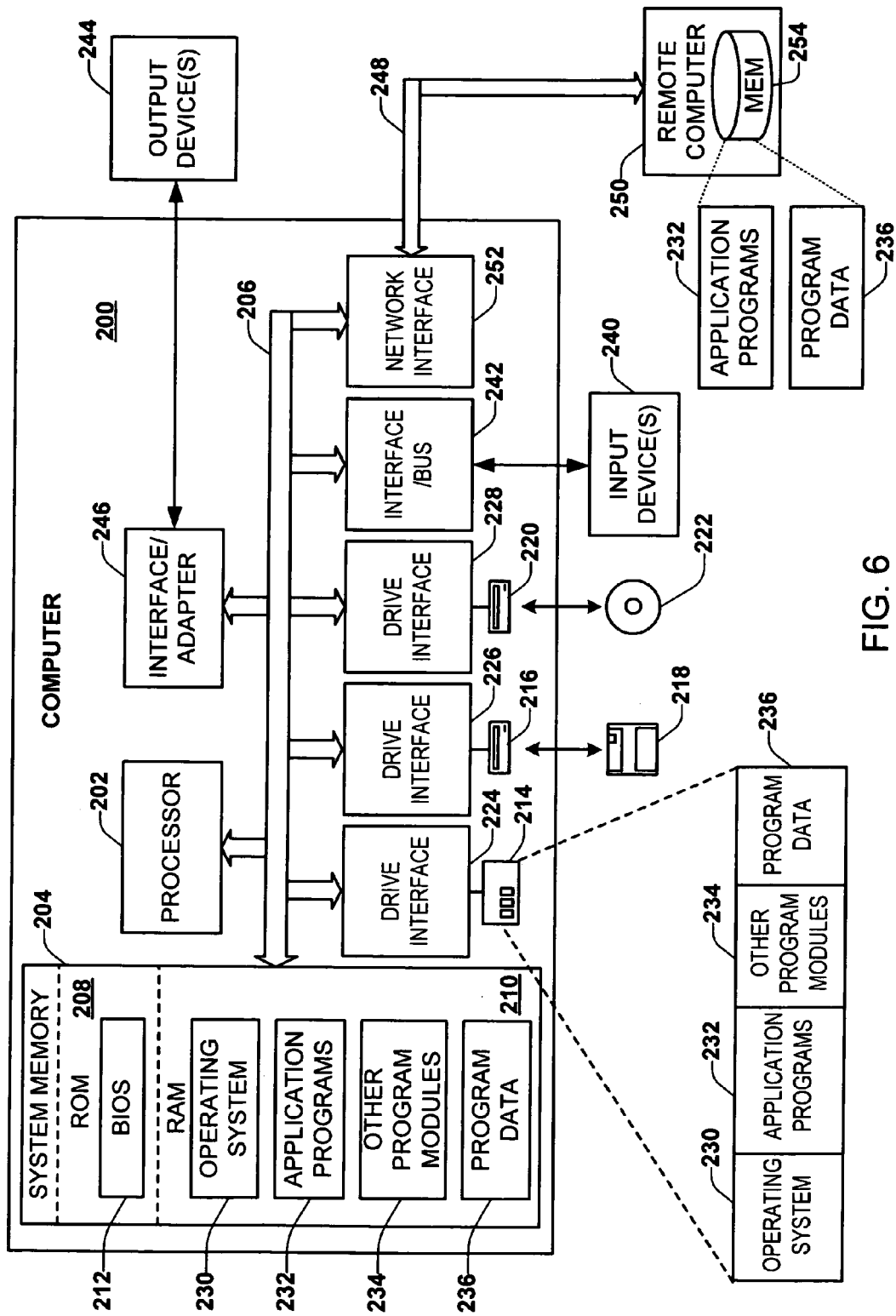
FIG. 6 illustrates a schematic block diagram of an exemplary operating environment for a system configured in accordance with an aspect of the present invention.

FIG. 6 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 306 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system for graphically representing uncertainty in an assisted decision-making application, comprising:
a processor and associated computer memory to process a database that contains a class vector for each of a plurality of structures in a geographic area that represents a theater of operation in which reliable information is not available, wherein a given class vector includes a plurality of possible classes that the associated structure is a member of and a corresponding set of confidence values associated with the plurality of possible classes, the database further containing a set of at least one assumption associated with each confidence value, wherein each class defines a functionality of the associated structure; and
a user interface that displays a plurality of graphics representing the structures, a given graphic including a set of at least two class icons, each corresponding to one of the plurality of possible classes associated with its corresponding structure, a qualitative indication of the confidence values associated with the plurality of possible classes, and a set of at least one assumption associated with a given confidence value;
wherein the user interface includes a map of the geographic area, and the structures in the geographic area represent buildings, vehicles, and other structures within the geographic area.

2. The system of claim 1, wherein the assumptions are displayed as a structured text list.

3. The system of claim 1, wherein the qualitative indication of a given confidence value comprises an associated saturation of the class icon associated with the confidence value.

4. The system of claim 1, wherein the assumptions are displayed as a structured argument comprising a plurality of nodes, representing evidence and hypotheses associated with a given confidence value, and connectors that illustrate the logical relationships between the hypotheses.

5. The system of claim 4, wherein a belief value associated with a given hypothesis are indicated by a qualitative feature in a node associated with the hypothesis.

6. The system of claim 4, wherein the structured argument is executable, such that a new confidence value can be determined in response to a change in one of the belief values and influence values of the structured argument by a user.

7. The system of claim 1, wherein the graphical user interface displays a set of at least one assumption associated a given confidence value in response to the input from a user.

8. The system of claim 1, wherein the qualitative indication of a given confidence value comprises a bar graph.

9. A computer readable medium comprising when executed by a processor:
a database that stores a class vector for each of a plurality of structures in a geographic area that represents a theater of operation in which reliable information is not available, wherein a given class vector includes a plurality of possible classes that its associated structure is a member of and a corresponding set of confidence values associated with the plurality of possible classes, the database further storing a set of assumptions associated with each confidence value, wherein each class defines a functionality of associated the structure; and
a graphical user interface that is operative to display a plurality of graphics representing the structures, a given graphic including a set of at least two class icons, each corresponding to one of the plurality of classes associated with a corresponding structure, a qualitative indication of the confidence values associated with the set of classes, and a set of at least one assumption associated with a given confidence value;
wherein the graphical user interface includes a map of the geographic area, and the structures in the geographic area represent buildings, vehicles, and other structures within the geographic area.

10. The computer program product of claim 9, the graphical user interface being operative to receive input from a user and display the assumptions associated with a given confidence value in response to the input from the user.

11. The computer readable medium of claim 9, the set of assumptions associated with each confidence value being stored as an executable belief network, comprising a plurality of nodes, representing evidence and hypotheses associated with a given confidence value, and connectors that illustrate the logical relationships between the hypotheses, the connectors having associated influence values representing the strength of the relationship between connected hypotheses.

12. The computer readable medium of claim 11, wherein influence values associated with a given connector are indicated by a qualitative feature of the connector.

13. The computer readable medium of claim 12, wherein the qualitative feature is an alteration in one of the thickness and color of the connector.

14. The computer readable medium of claim 9, the graphic user interface further comprising a decluttering tool that limits the set of class icons displayed for a given object of interest.

15. The computer readable medium of claim 14, wherein the decluttering tool allows the user to set at least one selection criteria, the graphic user interface only displaying class icons representing classes meeting the at least one criteria.

16. The computer readable medium of claim 15, the at least one criteria including a threshold confidence value, such that class icons representing classes having an associated confidence value less than the threshold confidence value are not displayed.

17. A computer implemented method for displaying uncertain information in an assisted decision-making application, comprising:
storing in a database, a class vector for each of a plurality of structures in a geographic area that represents a theater of operation in which reliable information is not available, wherein a given class vector includes a plurality of possible classes that its associated object of interest is a member of;
displaying a map of the geographic area that includes a plurality of icons representing a plurality of classes associated with an object of interest of the structures;
displaying a qualitative indication of respective confidence values associated with the plurality of classes, wherein each class defines a functionality of the associated structure; and
providing a set of assumptions associated with a given confidence value,
wherein the structures in the geographic area represent buildings, vehicles, and other structures within the geographic area.

18. The method of claim 17, where the set of assumptions are provided in response to input from a user.

19. The method of claim 17, wherein displaying a qualitative indication of the confidence value associated with a given class includes altering one of the saturation, hue, and transparency of the icon associated with the class.

20. The method of claim 17, wherein providing a set of assumptions associated with a given confidence value includes displaying an executable belief network to the user.

21. The method of claim 20, further comprising recalculating the confidence value of a given class in response to input from a user.

22. The method of claim 17, wherein providing a set of assumptions associated with a given confidence value includes providing evidence associated with the confidence value as a structured text list.

* * * * *